United States Patent
Khojastepour et al.

(10) Patent No.: US 10,677,906 B2
(45) Date of Patent: Jun. 9, 2020

(54) AMBIGUITY RESOLUTION FROM THE PHASE MEASUREMENT IN DISTANCE ESTIMATION BASED ON RADIO FREQUENCY SIGNALS

(71) Applicant: NEC Laboratories America, Inc., Princeton, NJ (US)

(72) Inventors: Mohammad Khojastepour, Lawrenceville, NJ (US); Mustafa Arslan, Princeton, NJ (US)

(73) Assignee: NEC Corporation (JP)

( * ) Notice: Subject to any disclaimer, the term of this patent is extended or adjusted under 35 U.S.C. 154(b) by 303 days.

(21) Appl. No.: 15/891,954

(22) Filed: Feb. 8, 2018

(65) Prior Publication Data

US 2018/0246186 A1 Aug. 30, 2018

Related U.S. Application Data

(60) Provisional application No. 62/463,774, filed on Feb. 27, 2017.

(51) Int. Cl.
*G01S 13/26* (2006.01)
*G01S 7/292* (2006.01)
(Continued)

(52) U.S. Cl.
CPC .......... *G01S 13/26* (2013.01); *G01S 5/0215* (2013.01); *G01S 5/0278* (2013.01); *G01S 5/12* (2013.01);
(Continued)

(58) Field of Classification Search
CPC ............ G06K 7/10366; G06K 19/0723; G01S 13/26; G01S 13/38; G01S 13/75;
(Continued)

(56) References Cited

U.S. PATENT DOCUMENTS

| 2002/0057217 A1* | 5/2002 | Milnes | G01C 21/28 |
| | | | 342/357.57 |
| 2005/0080560 A1* | 4/2005 | Hatch | G01S 19/44 |
| | | | 701/477 |

(Continued)

OTHER PUBLICATIONS

Sakurai et al., "Stream Monitoring under the Time Warping Distance", IEEE 23rd International Conference on Data Engineering, 2007, Apr. 2007, 10 pages.

*Primary Examiner* — Olumide Ajibade Akonai
(74) *Attorney, Agent, or Firm* — Joseph Kolodka

(57) ABSTRACT

A system is provided for resolving ambiguity in a phase measurement used in a distance estimation for an object. The system includes a transmitter for transmitting RF signals from an object location. The system includes measurement equipment for receiving the transmitted RF signals as corresponding received RF signals and measuring a plurality of phases at different frequencies between the transmitted RF signals and the corresponding received RF signals. The system includes a processor. The processor is configured to calculate normalized phases from the plurality of measured phases. The processor is configured to perform an intra-frequency ambiguity resolution process that resolves an ambiguity for the normalized phases for a single frequency using an ambiguity factor. The processor is configured to perform an inter-frequency ambiguity resolution process that resolves an ambiguity for the normalized phases across multiple tones using a characteristic curve to provide a resolved phase measurement for the distance estimation.

20 Claims, 9 Drawing Sheets

(51) Int. Cl.
*G01S 13/38* (2006.01)
*G01S 13/75* (2006.01)
*G01S 11/02* (2010.01)
*G01S 5/02* (2010.01)
*G01S 5/12* (2006.01)
*G01S 5/14* (2006.01)
*G01S 11/06* (2006.01)
*G01S 7/35* (2006.01)
*G01S 7/41* (2006.01)
*G01S 13/34* (2006.01)
*G01S 13/36* (2006.01)
*G06K 7/10* (2006.01)
*G06K 19/07* (2006.01)

(52) U.S. Cl.
CPC .............. *G01S 5/14* (2013.01); *G01S 7/2923* (2013.01); *G01S 7/354* (2013.01); *G01S 7/41* (2013.01); *G01S 11/02* (2013.01); *G01S 11/026* (2013.01); *G01S 11/06* (2013.01); *G01S 13/34* (2013.01); *G01S 13/36* (2013.01); *G01S 13/38* (2013.01); *G01S 13/75* (2013.01); *G06K 7/10366* (2013.01); *G06K 19/0723* (2013.01)

(58) Field of Classification Search
CPC ...... G01S 11/02; G01S 5/0215; G01S 5/0278; G01S 5/12; G01S 5/14; G01S 11/026; G01S 11/06; G01S 7/354; G01S 7/41; G01S 13/34; G01S 13/36; G01S 7/2923
See application file for complete search history.

(56) References Cited

U.S. PATENT DOCUMENTS

| | | | |
|---|---|---|---|
| 2008/0122688 A1* | 5/2008 | Hatch | G01S 19/44 342/357.27 |
| 2009/0243932 A1* | 10/2009 | Moshfeghi | G01S 5/14 342/378 |
| 2013/0310074 A1* | 11/2013 | Porzio Giusto | G01S 11/02 455/456.1 |
| 2017/0074979 A1* | 3/2017 | Nielsen | G01S 17/36 |

* cited by examiner

AMBIGUITY RESOLUTION FROM THE PHASE MEASUREMENT IN DISTANCE ESTIMATION BASED ON RADIO FREQUENCY SIGNALS

RELATED APPLICATION INFORMATION

This application claims priority to provisional application Ser. No. 62/463,774, filed on Feb. 27, 2017, incorporated herein by reference. This application is related to an application 15/891,800 entitled "Distance Estimation Using Phase Information", and which is incorporated by reference herein in its entirety. This application is related to an application 15/891,906 entitled "Distance Estimation Using Multiple Phase Differences", and which is incorporated by reference herein in its entirety. This application is related to an application 15/891,994 entitled "Distance Estimation Between an RFID Tag and an RFID Reader", and which is incorporated by reference herein in its entirety.

BACKGROUND

Technical Field

The present invention relates to distance estimation, and more particularly to ambiguity resolution from the phase measurement in distance estimation based on radio frequency signals.

Description of the Related Art

The problem of estimating the distance between two objects has many use cases depending on the accuracy of the estimation. A telemetric instrument using laser beams enables applications that do not require high accuracy such as land surveying. On the other hand, laser devices can be used for professional sports (centimeter accuracy) and tool tuning where sub-millimeter accuracy is required.

One particular class of sensor-based distance estimation is RF-based (radio frequency based) distance estimation. RF-based distance estimation and ultrasonic (sound-based) measurement have been around for decades and were used primarily in radar/sonar applications. The main idea is to estimate the time-of-flight for the wave that is traveling between two end points, e.g., a fixed measurement point to an object of interest. Given the speed of the wave in a particular medium between the two end points, the distance is found by the knowledge of the time-of-flight. However, for small distances, the time-of-flight for RF waves is very small and it is not possible to simply find it by simple transmission of a pulse and detection of the time between the transmission and reception of the pulse. Moreover, in most of the bands, the RF-signal may pass though different media, and get absorbed or reflected from objects. Hence, the received signal usually has multiple copies of the transmitted signal with different gain and phases that are distorted by non-flat fading. These challenges make the problem of RF-based distance estimation challenging.

Accordingly, there is a need for a solution to the aforementioned of estimating the distance between two objects, particularly for the case of RF-based distance estimation.

SUMMARY

According to an aspect of the present invention, a system is provided for resolving ambiguity in a phase measurement used in a distance estimation for an object. The system includes a transmitter for transmitting RF signals from a location of the object. The system further includes measurement equipment, including a receiver, for receiving the transmitted RF signals as corresponding received RF signals and measuring a plurality of phases at different frequencies between the transmitted RF signals and the corresponding received RF signals. The system also includes a processor. The processor is configured to calculate normalized phases from the plurality of measured phases. The processor is further configured to perform an intra-frequency ambiguity resolution process that resolves an ambiguity for the normalized phases for a single frequency using an ambiguity factor. The processor is also configured to perform an inter-frequency ambiguity resolution process that resolves an ambiguity for the normalized phases across a plurality of tones using a characteristic curve to provide a resolved phase measurement for the distance estimation for the object.

According to another aspect of the present invention, a computer-implemented method is provided for resolving ambiguity in a phase measurement used in a distance estimation for an object. The method includes measuring, by measurement equipment, a plurality of phases at different frequencies between transmitted Radio Frequency (RF) signals from a location of the object and corresponding received RF signals at the measurement equipment. The method further includes calculating, by a processor, normalized phases from the plurality of measured phases. The method also includes performing, by the processor, an intra-frequency ambiguity resolution process that resolves an ambiguity for the normalized phases for a single frequency using an ambiguity factor. The method additionally includes performing, by the processor, an inter-frequency ambiguity resolution process that resolves an ambiguity for the normalized phases across a plurality of tones using a characteristic curve to provide a resolved phase measurement for the distance estimation for the object.

According to yet another aspect of the present invention, a computer program product is provided for resolving ambiguity in a phase measurement used in a distance estimation for an object. The computer program product includes a non-transitory computer readable storage medium having program instructions embodied therewith. The program instructions are executable by a computer to cause the computer to perform a method. The method includes measuring, by measurement equipment, a plurality of phase differences at different frequencies between transmitted Radio Frequency (RF) signals from a location of the object and corresponding received RF signals at the measurement equipment. The method further includes calculating, by a processor, normalized phases from the measured phases. The method also includes performing, by the processor, an intra-frequency ambiguity resolution process that resolves an ambiguity for the normalized phases for a single frequency using an ambiguity factor. The method additionally includes performing, by the processor, an inter-frequency ambiguity resolution process that resolves an ambiguity for the normalized phases across a plurality of tones using a characteristic curve to provide a resolved phase measurement for the distance estimation for the object.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to ambiguity resolution from the phase measurement in distance estimation based on radio frequency signals.

It is to be appreciated that recognition in distance estimation using phase information in accordance with the present invention can be applied to applications including, but not limited to, any of the following: distance estimation using multiple phase differences; ambiguity resolution from the phase measurement in distance estimation based on radio frequency signals; and distance estimation between an RFID tag and an RFID reader; and so forth. Of course, the present invention can also be applied to a myriad of other applications, as readily appreciated by one of ordinary skill in the art given the teachings of the present invention provided herein, while maintaining the spirit of the present invention.

Figure 1:
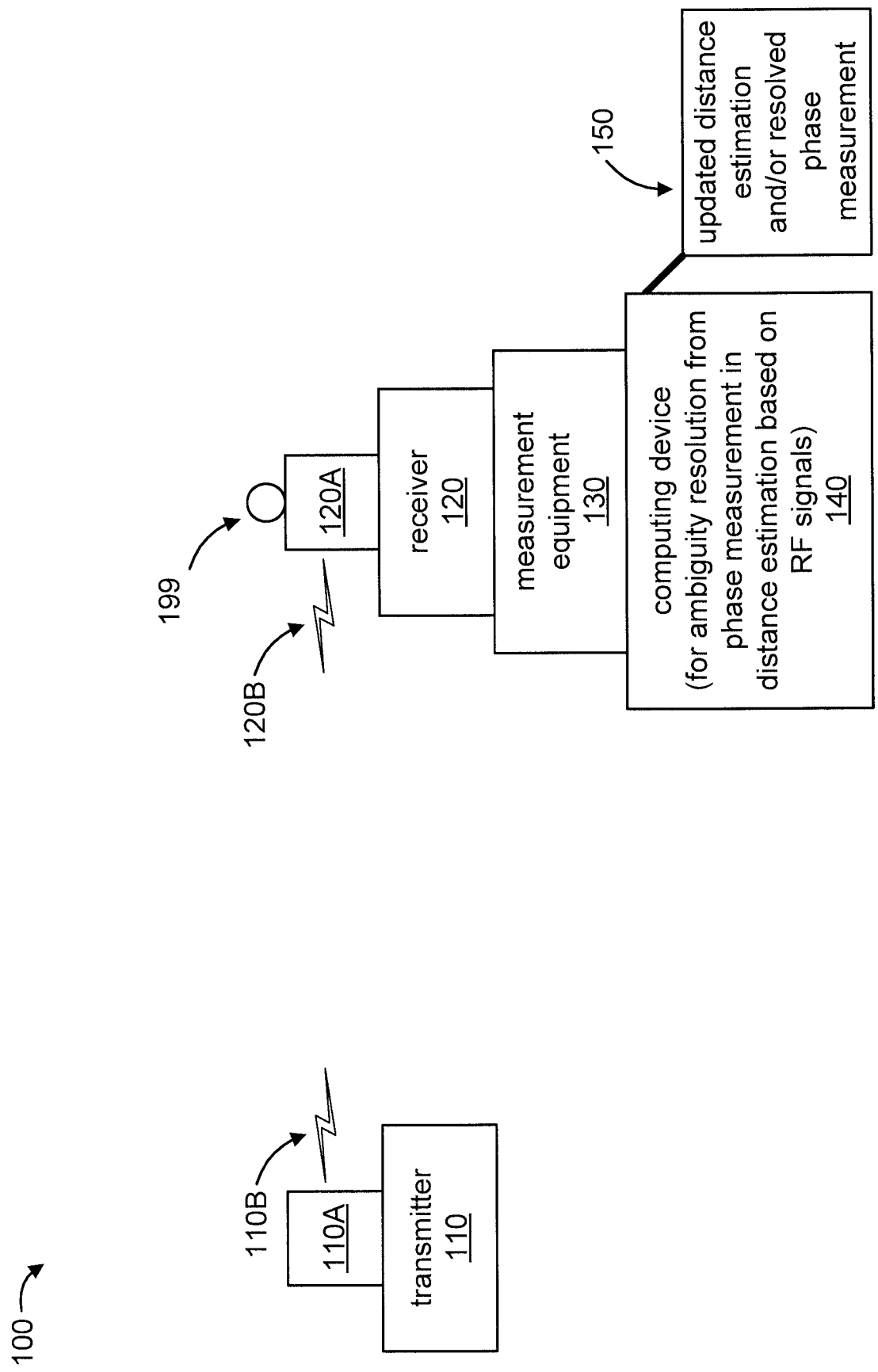
FIG. 1 shows an exemplary system for ambiguity resolution from the phase measurement in distance estimation based on radio frequency signals, in accordance with an embodiment of the present principles.

FIG. 1 shows an exemplary system 100 for ambiguity resolution from the phase measurement in distance estimation based on radio frequency signals, in accordance with an embodiment of the present principles.

The system 100 includes a Radio Frequency (RF) transmitter 110, a RF receiver 120, phase measurement equipment (interchangeably referred to herein as "measurement equipment" or "ME") 130, and at least one computing device 140. In an embodiment, the system 100 can further include a display device 150.

The RF transmitter 110 includes a set 110A of one or more antennas, and the RF receiver 120 includes a set 120A of one or more antennas.

In an embodiment, the at least one computing device 140 is for controlling operations of one or more of the RF transmitter 110, the RF receiver 120, and the phase measurement equipment 130. Communications between the RF transmitter 110 and the measurement equipment 130 are now shown in FIG. 1 for the sake of clarity. However, any communication technology can be used between the elements of system 100, while maintaining the spirit of the present invention. In an embodiment, the at least one computing device 140 can be a processor-based device such as, for example, but not limited to, a controller, a server, and so forth. In an embodiment, the at least one computing device 140 is part of the measurement equipment 130. In another embodiment, the at least one computing device 140 is a separate device from the measurement equipment 130 that is operatively coupled to, and located at a same location as, the measurement equipment 130.

The system 100 is applied to an object 199 (interchangeably referred to herein as "OBJ") whose distance is to be measured from a reference point. The system 100 is configured to resolve ambiguity from phase measurements in distance estimation based on Radio Frequency (RF) signals. In the embodiment of FIG. 1, the measurement equipment 130 and the receiver 120 are located at the same location. Hence, the reference point can be considered to be the (common) location of the measurement equipment 130 or the receiver 120, such that the distance measurement can be considered to span the distance from the object to any of the measurement equipment 130 or the receiver 120 given their common location.

The at least one computing device 140 is configured to perform distance estimation using phase information. To that end, the transmitter 110 transmits RF signals from a location of the object 199. The receiver 120 receives the transmitted RF signals as corresponding received RF signals. The measurement equipment 130 measures a plurality of phases at different frequencies between the transmitted RF signals and the corresponding received RF signals.

The at least one computing device 140 is operatively coupled to the measurement equipment 130 and is configured to calculate normalized phases from the plurality of measured phases, perform an intra-frequency ambiguity resolution process that resolves an ambiguity for the normalized phases for a single frequency using an ambiguity factor, and perform an inter-frequency ambiguity resolution process that resolves an ambiguity for the normalized phases across a plurality of tones using a characteristic curve to provide a resolved phase measurement for the distance estimation for the object. In an embodiment, the at least one computing device 140 can be configured to provide an updated distance estimation based on the resolved phase measurement.

In an embodiment, the display device 150 is operatively coupled to the at least one computing device 140 and is configured to display the estimate of the distance. In this way, an estimate of the distance from the receiver 120 or ME 130 is estimated using phase information and provided to a user.

Figure 2:
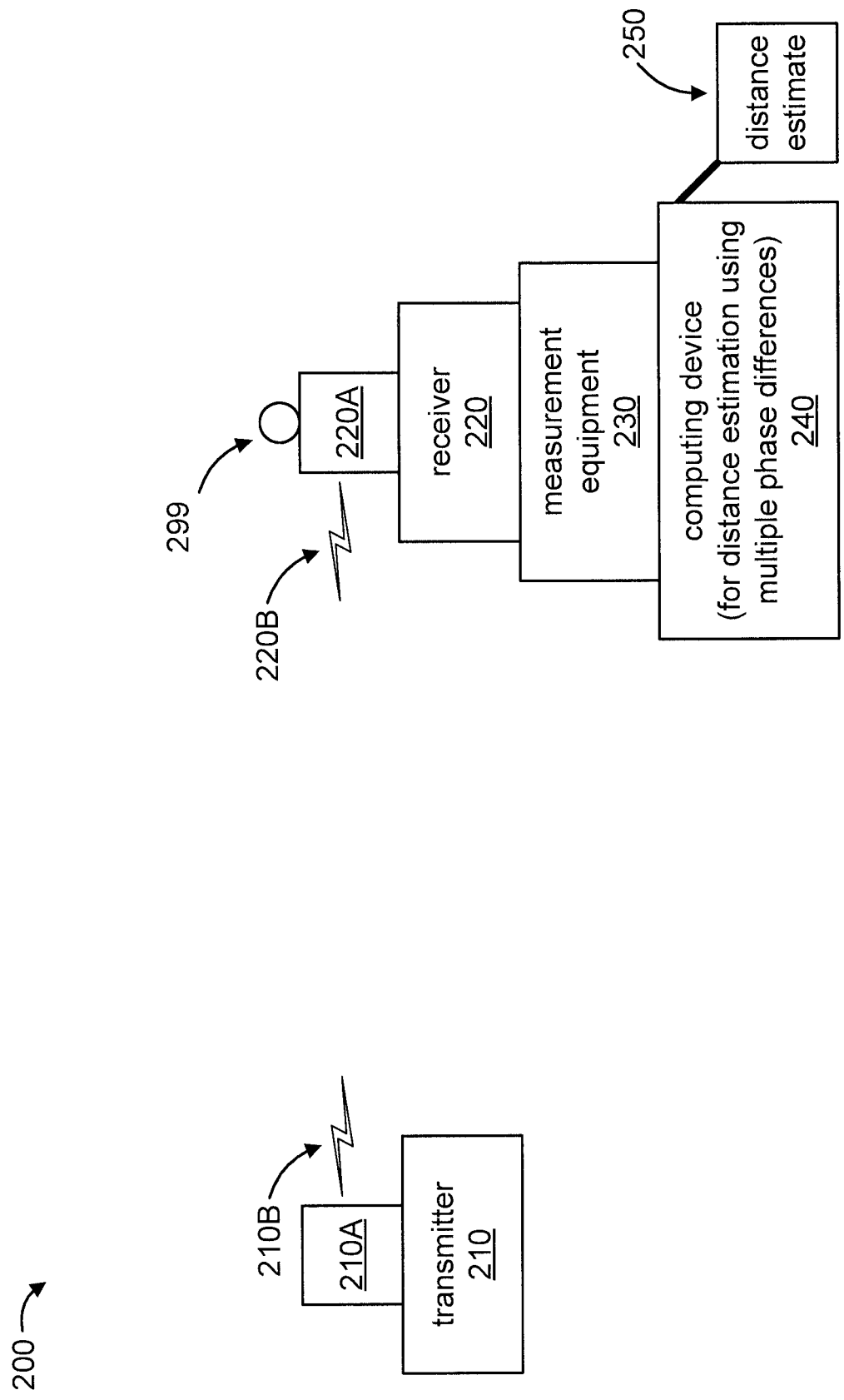
FIG. 2 shows an exemplary system for distance estimation using multiple phase differences, in accordance with an embodiment of the present invention.

FIG. 2 shows an exemplary system 200 for distance estimation using multiple phase differences, in accordance with an embodiment of the present invention.

The system 200 includes a Radio Frequency (RF) transmitter 210, a RF receiver 220, phase measurement equipment (interchangeably referred to herein as "measurement equipment" or "ME") 230, and at least one computing device 240. In an embodiment, the system 200 can further include a display device 250.

The RF transmitter 210 includes a set 210A of one or more antennas, and the RF receiver 220 includes a set 220A of one or more antennas.

In an embodiment, the at least one computing device 240 is for controlling operations of one or more of the RF transmitter 210, the RF receiver 220, and the phase measurement equipment 230. Communications between the RF transmitter 210 and the measurement equipment 230 are now shown in FIG. 2 for the sake of clarity. However, any communication technology can be used between the elements of system 200, while maintaining the spirit of the present invention. In an embodiment, the at least one computing device 240 can be a processor-based device such as, for example, but not limited to, a controller, a server, and so forth. In an embodiment, the at least one computing device 240 is part of the measurement equipment 230. In another embodiment, the at least one computing device 240 is a separate device from the measurement equipment 230 that is operatively coupled to, and located at a same location as, the measurement equipment 230.

The system 200 is applied to an object 299 (interchangeably referred to herein as "OBJ") whose distance is to be measured from a reference point. In the embodiment of FIG. 2, the measurement equipment 230 and the receiver 220 are located at the same location. Hence, the reference point can be considered to be the (common) location of the measurement equipment 230 or the receiver 220, such that the distance measurement can be considered to span the distance from the object to any of the measurement equipment 230 or the receiver 220 given their common location.

The at least one computing device 240 is configured to perform distance estimation using multiple phase differences. To that end, the transmitter 210 transmits RF signals from a location of the object 299. The receiver 220 receives the transmitted RF signals as corresponding received RF signals. The measurement equipment 230 measures a plurality of phase differences at different frequencies between the transmitted RF signals and the corresponding received RF signals.

The at least one computing device 240 is operatively coupled to the measurement equipment 230 and is configured to calculate corrected phases by resolving one or more ambiguities from the plurality of phase differences, obtain a characteristic curve using the corrected phases, and provide an estimate of the distance based on the characteristic curve and the corrected phases.

In an embodiment, the display device 250 is operatively coupled to the at least one computing device 240 and is configured to display the estimate of the distance. In this way, an estimate of the distance from the receiver 220 or ME 230 is estimated using multiple phase differences and provided to a user.

Figure 3:
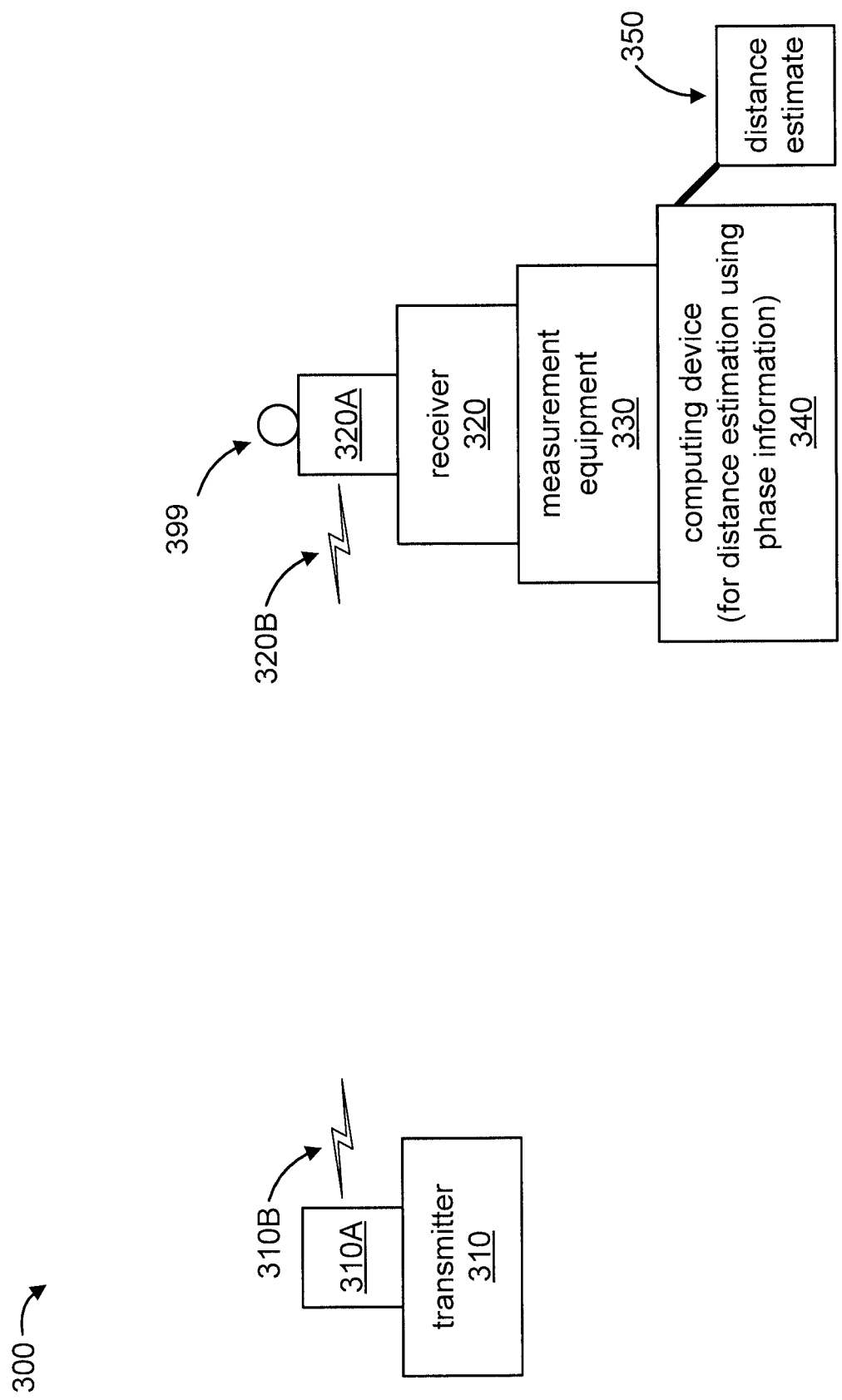
FIG. 3 shows an exemplary system for distance estimation using phase information, in accordance with an embodiment of the present invention.

FIG. 3 shows an exemplary system 300 for distance estimation using phase information, in accordance with an embodiment of the present invention.

The system 300 includes a Radio Frequency (RF) transmitter 310, a RF receiver 320, phase measurement equipment (interchangeably referred to herein as "measurement equipment" or "ME") 330, and at least one computing device 340. In an embodiment, the system 300 can further include a display device 350.

The RF transmitter 310 includes a set 310A of one or more antennas, and the RF receiver 320 includes a set 320A of one or more antennas.

In an embodiment, the at least one computing device 340 is for controlling operations of one or more of the RF transmitter 310, the RF receiver 320, and the phase measurement equipment 330. Communications between the RF transmitter 310 and the measurement equipment 330 are now shown in FIG. 3 for the sake of clarity. However, any communication technology can be used between the elements of system 300, while maintaining the spirit of the present invention. In an embodiment, the at least one computing device 340 can be a processor-based device such as, for example, but not limited to, a controller, a server, and so forth. In an embodiment, the at least one computing device 340 is part of the measurement equipment 330. In another embodiment, the at least one computing device 340 is a separate device from the measurement equipment 330 that is operatively coupled to, and located at a same location as, the measurement equipment 330.

The system 300 is applied to an object 399 (interchangeably referred to herein as "OBJ") whose distance is to be measured from a reference point. In the embodiment of FIG. 3, the measurement equipment 330 and the receiver 320 are located at the same location. Hence, the reference point can be considered to be the (common) location of the measurement equipment 330 or the receiver 320, such that the distance measurement can be considered to span the distance from the object to any of the measurement equipment 330 or the receiver 320 given their common location.

For the sake of clarity, a definition of some of the terms used herein will now be given. As used herein, the terms "measured phase" and "differential phase" interchangeably refer to the difference between the phases of the backscattered (or received) signal and the transmitted signal. Moreover, as used herein, the term "normalized phase" refers to a scaled version of the differential phase in order to convert the differential phase into a different range, e.g., $[0,1]$ instead of $[0, 2 \pi]$. The normalized phase can also be used to change the dimension of the differential phase. For example to transform the differential phase into a distance that is a fraction of the waveform which is equivalent to that differential phase.

The at least one computing device 340 is configured to perform distance estimation using phase information. To that end, the transmitter 310 transmits RF signals 310B from a location of the object 399. The receiver 320 receives the transmitted RF signals as corresponding received RF signals 320B. The measurement equipment 330 measures a plurality of phase differences at different frequencies between the transmitted RF signals and the corresponding received RF signals.

The at least one computing device 340 is operatively coupled to the measurement equipment 330 and is configured to calculate normalized phases from the plurality of phase differences, calculate corrected phases by resolving one or more ambiguities from the normalized phases, obtain a characteristic curve using the corrected phases, and provide an estimate of the distance based on the characteristic curve and the corrected phases.

In an embodiment, the display device 350 is operatively coupled to the at least one computing device 340 and is configured to display the estimate of the distance. In this way, an estimate of the distance from the receiver 320 or ME 330 is estimated using phase information and provided to a user.

Figure 4:
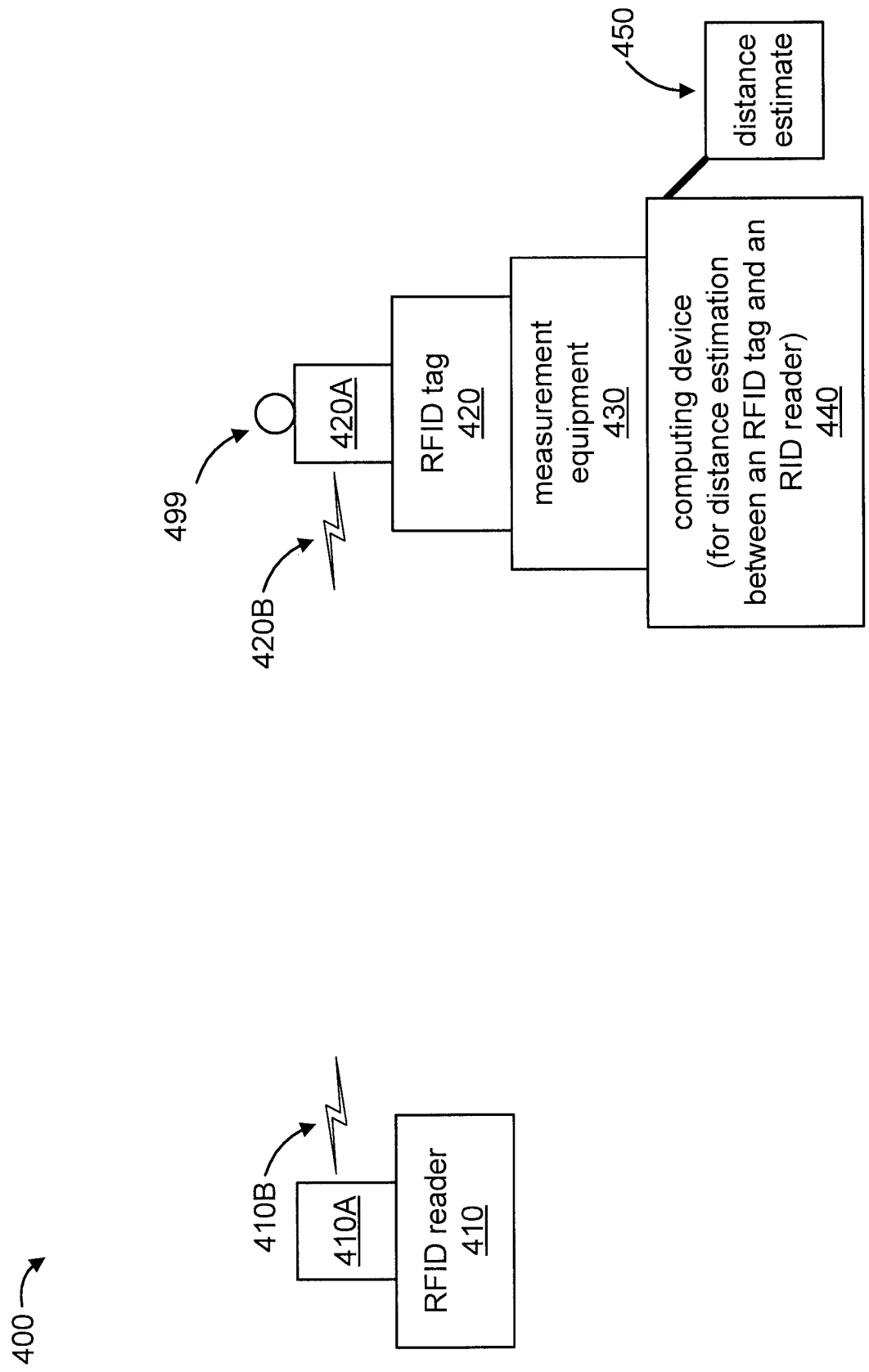
FIG. 4 shows an exemplary system for distance estimation between an RFID tag and an RFID reader, in accordance with an embodiment of the present invention.

FIG. 4 shows an exemplary system 400 for distance estimation between an RFID tag and an RFID reader, in accordance with an embodiment of the present invention.

The system 400 includes a Radio Frequency Identifier (RFID) reader 410, a RFID tag 420, phase measurement equipment (interchangeably referred to herein as "measurement equipment" or "ME") 430, and at least one computing device 440. In an embodiment, the system 400 can further include a display device 450.

The RFID reader 410 includes a set 410A of one or more antennas, and the RF tag 420 includes a set 420A of one or more antennas.

In an embodiment, the at least one computing device 440 is for controlling operations of one or more of the RF reader 410, the RF tag 420, and the phase measurement equipment 430. Communications between the RF reader 410 and the measurement equipment 430 are now shown in FIG. 4 for the sake of clarity. However, any communication technology can be used between the elements of system 400, while maintaining the spirit of the present invention. In an embodiment, the at least one computing device 440 can be a processor-based device such as, for example, but not limited to, a controller, a server, and so forth. In an embodiment, the at least one computing device 440 is part of the measurement equipment 430. In another embodiment, the at least one computing device 440 is a separate device from the measurement equipment 430 that is operatively coupled to, and located at a same location as, the measurement equipment 430.

The system 400 is applied to the RFID tag 420 (interchangeably referred to herein as "OBJ") whose distance is to be measured from a reference point. In an embodiment, the system can be applied to an object 499 attached to the RFID tag, wherein the attached object can be interchangeably referred to herein as "OBJ", as opposed to the RFID tag. In the embodiment of FIG. 4, the measurement equipment 430 and the RFID reader 420 are located at the same location. Hence, the reference point can be considered to be the (common) location of the measurement equipment 430 or the RFID reader 420, such that the distance measurement can be considered to span the distance from the object to any of the measurement equipment 430 or the RFID reader 420 given their common location.

The measurement equipment 430 is configured to measure a plurality of phase differences at different frequencies between transmitted Radio Frequency (RF) signals from the RFID reader 420 and corresponding received RF signals at the RFID tag 410.

The at least one computing device 440 is configured to calculate normalized phases from the plurality of phase differences, calculate corrected phases by resolving one or more ambiguities from the normalized phases, obtain a characteristic curve using the corrected phases, and provide an estimate of the distance based on the characteristic curve and the corrected phases.

Further regarding the systems 100, 200, 300, and 400 of FIGS. 1, 2, 3, and 4, respectively, it is to be appreciated that while some of the constituent elements thereof are shown as separate elements, in other embodiments, one or more elements can be combined. For example, the receiver can be part of the ME, the ME can be part of the at least one computing device, the transmitted can be part of the ME, and so forth. These and other variations and configurations of the elements of systems 100, 200, 300, and 400 are readily determined by one of ordinary skill in the art given the teachings of the present invention provided herein, while maintaining the spirit of the present invention.

Figure 5:
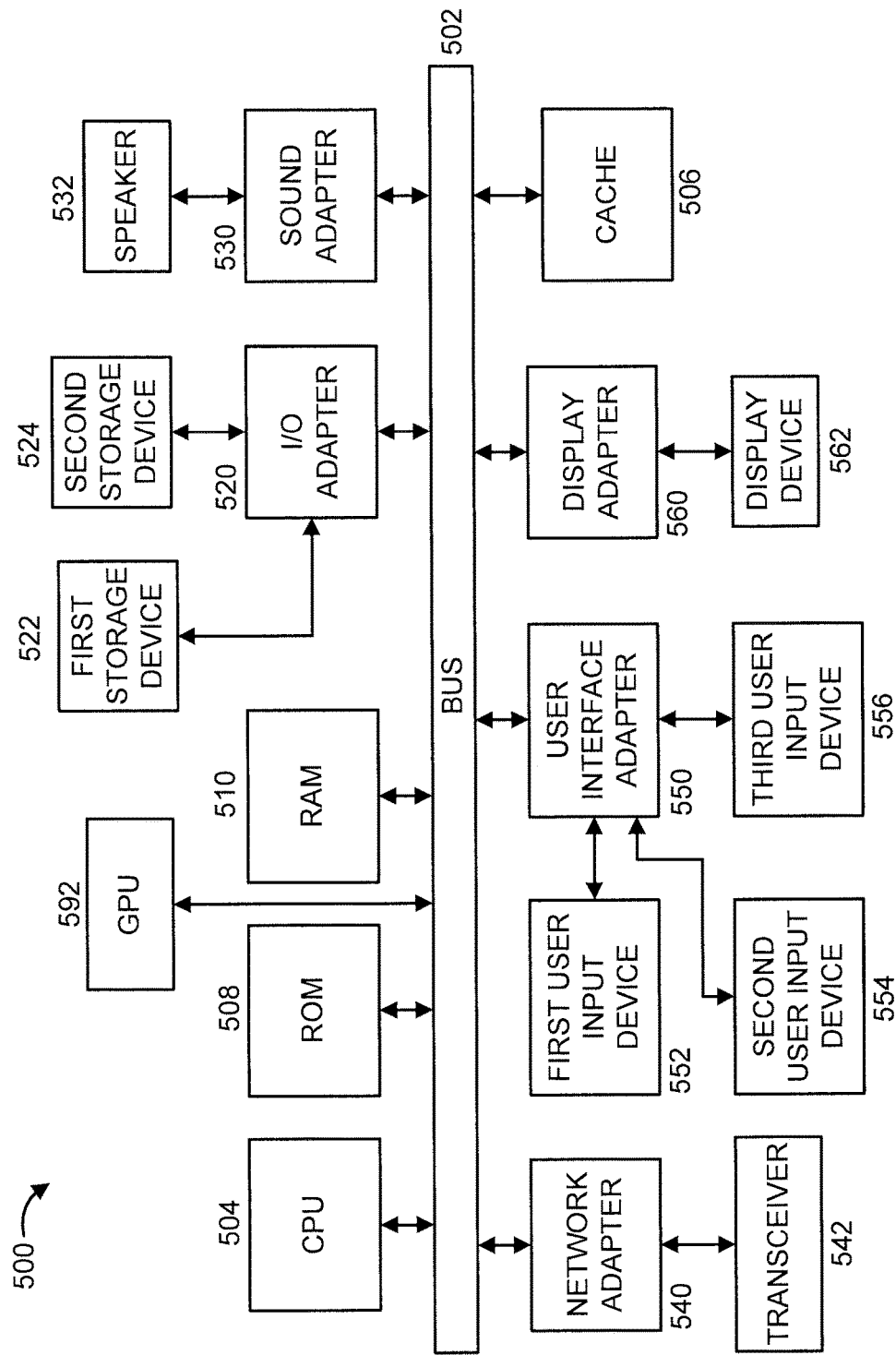
FIG. 5 shows an exemplary processing system to which the present principles may be applied, according to an embodiment of the present principles.

FIG. 5 shows an exemplary processing system 500 to which the present principles may be applied, according to an embodiment of the present principles. In an embodiment, the at least one computing device 140 of FIG. 1, the at least one computing device 240 of FIG. 2, the at least one computing device 340 of FIG. 3, and the at least one computing device 440 of FIG. 4 can be implemented, at least in part, by processing system 500.

The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502. The processing system 500 further includes at least one Graphics Processing Unit (GPU) 592.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Moreover, it is to be appreciated that systems 100, 200, 300, and 400 described above with respect to FIGS. 1, 2, 4, and 4, respectively, are systems for implementing respective embodiments of the present principles. Part or all of processing system 500 may be implemented in one or more of the elements of any of systems 100, 200, 300, and 400.

Figure 6:
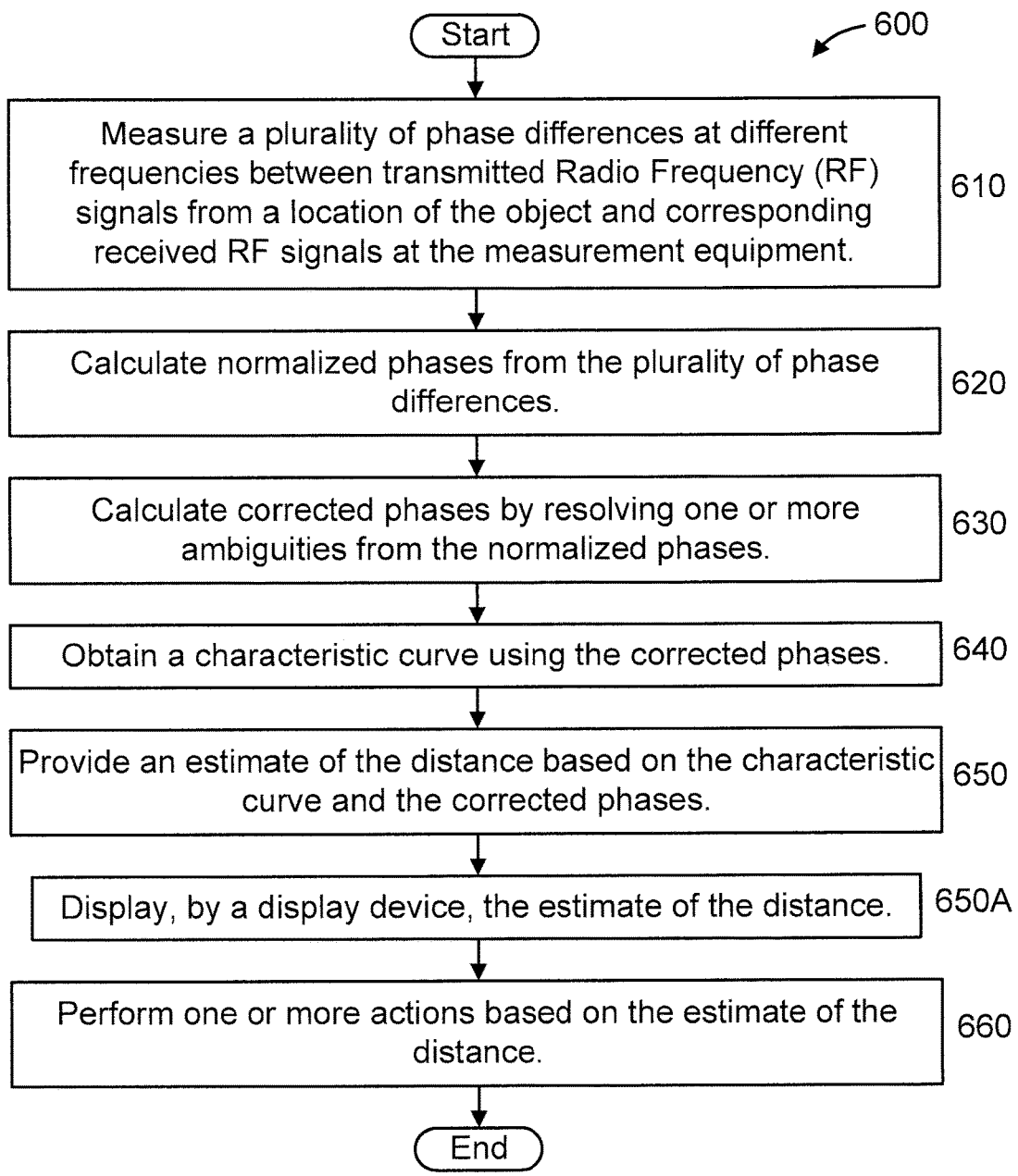
FIG. 6 shows an exemplary method for distance estimation using phase information, in accordance with an embodiment of the present principles.
Figure 7:
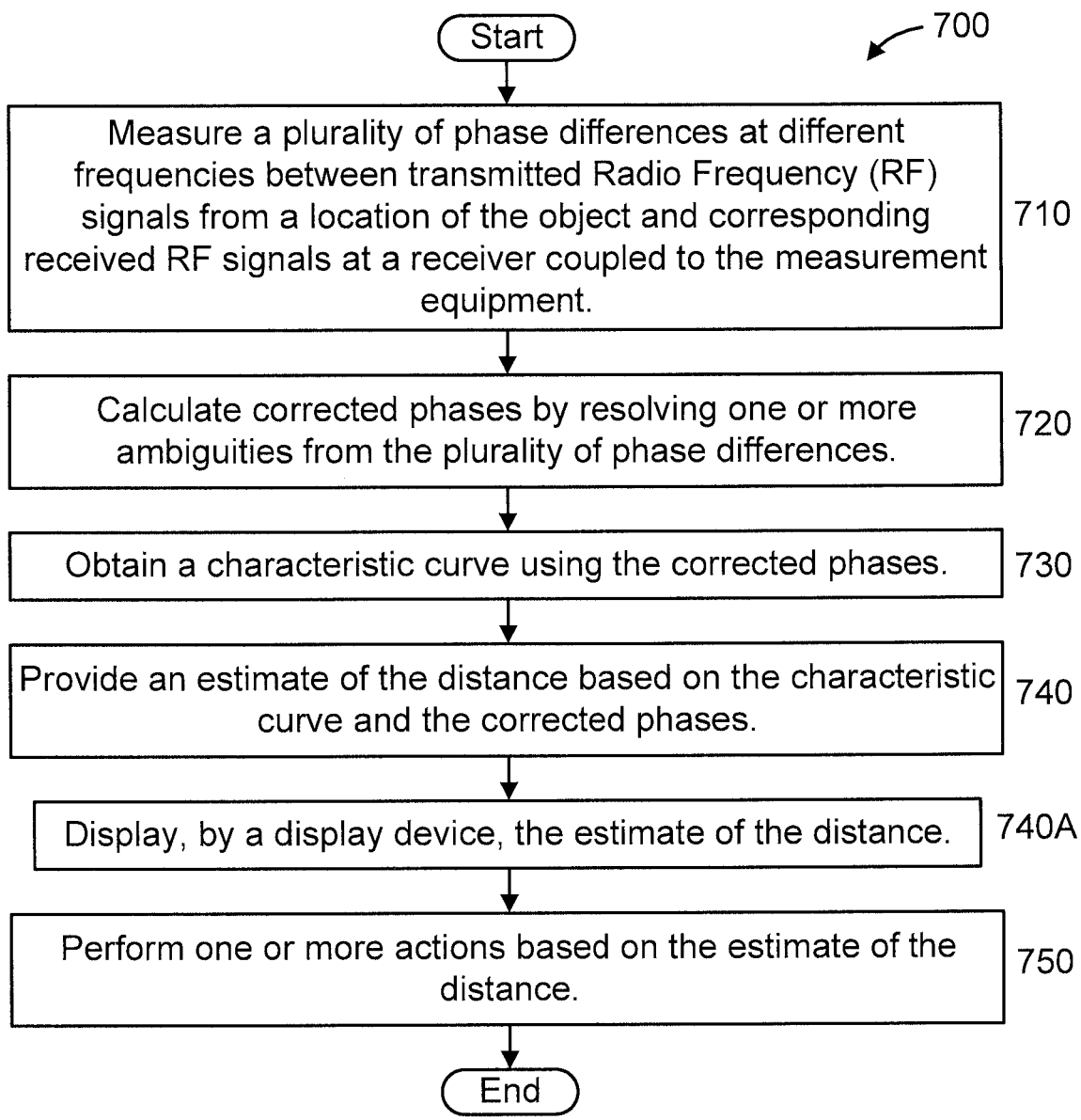
FIG. 7 shows an exemplary method for distance estimation using multiple phase differences, in accordance with an embodiment of the present principles.
Figure 8:
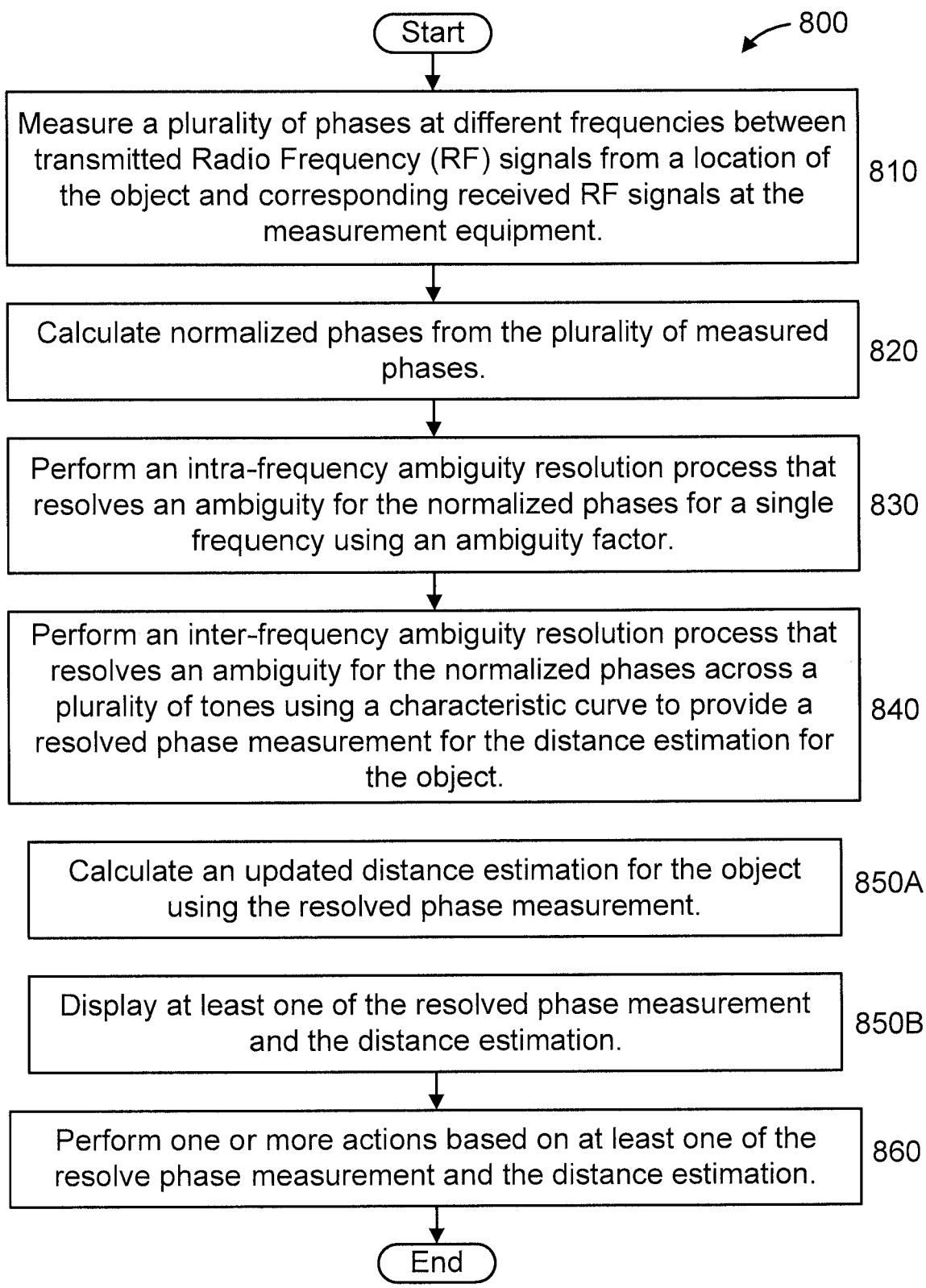
FIG. 8 shows an exemplary method for ambiguity resolution from the phase measurement in distance estimation based on radio frequency signals, in accordance with an embodiment of the present principles.
Figure 9:
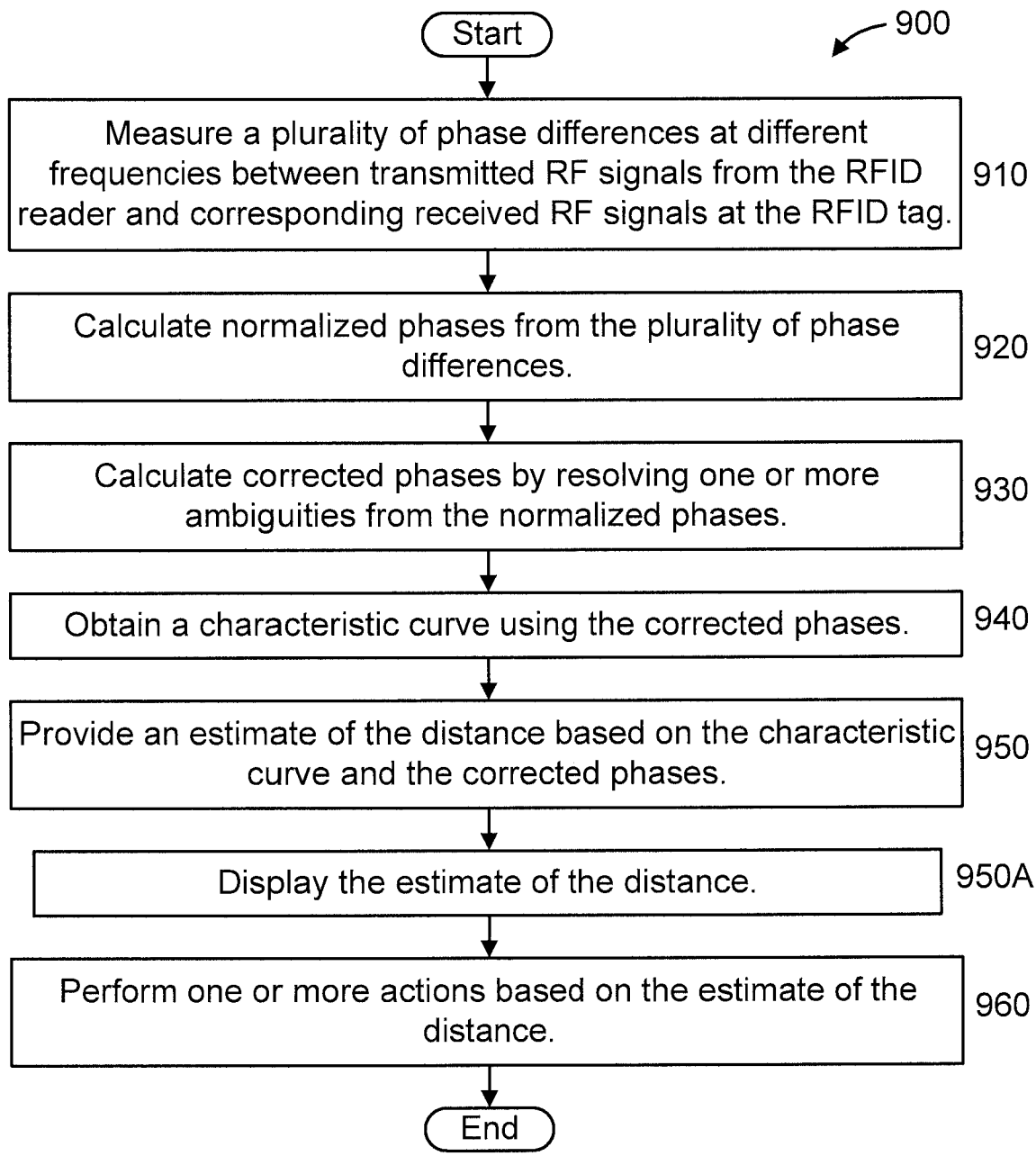
FIG. 9 shows an exemplary method for distance estimation between an RFID tag and an RFID reader, in accordance with an embodiment of the present principles.

Further, it is to be appreciated that system 500 may perform at least part of the methods described herein including, for example, at least part of method 600 of FIG. 6 and/or at least part of method 700 of FIG. 7, and/or at least part of method 800 of FIG. 8 and/or at least part of method 900 of FIG. 9. Similarly, part or all of any of systems 100, 200, 300, and/or 400 may be used to perform at least part of method 600 of FIG. 6 and/or at least part of method 700 of FIG. 7, and/or at least part of method 800 of FIG. 8 and/or at least part of method 900 of FIG. 9.

FIG. 6 shows an exemplary method 600 for distance estimation using phase information, in accordance with an embodiment of the present principles. In an embodiment, the method 600 can be used to estimate the distance between an object and measurement equipment using phase information. In an embodiment, the method 600 of FIG. 6 is performed by, e.g., system 100 of FIG. 1.

At block 610, measure, by the measurement equipment, a plurality of phase differences at different frequencies between transmitted Radio Frequency (RF) signals from a location of the object and corresponding received RF signals at the measurement equipment.

At block 620, calculate, by the at least one computing device, normalized phases from the plurality of phase differences.

At block 630, calculate, by the at least one computing device, corrected phases by resolving one or more ambiguities from the normalized phases.

At block 640, obtain, by the at least one computing device, a characteristic curve using the corrected phases.

At block 650, provide, by the at least one computing device, an estimate of the distance based on the characteristic curve and the corrected phases.

In an embodiment, block 650 can include block 650A.

At block 650A, display, by a display device, the estimate of the distance.

At block 660, perform one or more actions based on the estimate of the distance. For example, the one or more actions can be directed to one or more of the following: object tracking; an Advanced Driver-Assistance System (ADAS); surveillance; and so forth.

FIG. 7 shows an exemplary method 700 for distance estimation using multiple phase differences, in accordance with an embodiment of the present principles. In an embodiment, the method 600 can be used to estimate the distance between an object and measurement equipment using multiple phase differences. In an embodiment, the method 700 of FIG. 7 is performed by, e.g., system 200 of FIG. 2.

At block 710, measure, by the measurement equipment, a plurality of phase differences at different frequencies between transmitted Radio Frequency (RF) signals from a location of the object and corresponding received RF signals at a receiver coupled to the measurement equipment.

At block 720, calculate, by the at least one computing device, corrected phases by resolving one or more ambiguities from the plurality of phase differences.

At block 730, obtain, by the at least one computing device, a characteristic curve using the corrected phases.

At block 740, provide, by the at least one computing device, an estimate of the distance based on the characteristic curve and the corrected phases.

In an embodiment, block 740 can include block 740A.

At block 740A, display, by a display device, the estimate of the distance.

At block 750, perform one or more actions based on the estimate of the distance. For example, the one or more actions can be directed to one or more of the following: object tracking; an Advanced Driver-Assistance System (ADAS); surveillance; and so forth.

FIG. 8 shows an exemplary method 800 for ambiguity resolution from the phase measurement in distance estimation based on radio frequency signals, in accordance with an embodiment of the present principles. In an embodiment, the method 800 can be used for ambiguity resolution in a distance estimation relating to the distance between an object and measurement equipment. In an embodiment, the method 800 of FIG. 8 is performed by, e.g., system 300 of FIG. 3.

At block 810, measure, by measurement equipment, a plurality of phases at different frequencies between transmitted Radio Frequency (RF) signals from a location of the object and corresponding received RF signals at the measurement equipment.

At block 820, calculate, by the at least one computing device, normalized phases from the plurality of measured phases.

At block 830, perform, by the at least one computing device, an intra-frequency ambiguity resolution process that resolves an ambiguity for the normalized phases for a single frequency using an ambiguity factor.

At block 840, perform, by the at least one computing device, an inter-frequency ambiguity resolution process that resolves an ambiguity for the normalized phases across a plurality of tones using a characteristic curve to provide a resolved phase measurement for the distance estimation for the object.

In an embodiment, block 840 can includes blocks 840A and 840B.

At block 840A, calculate, by the at least one computing device, an updated distance estimation for the object using the resolved phase measurement.

At block 840B, display, by a display device, at least one of the resolved phase measurement and the distance estimation.

At block 850, perform one or more actions based on at least one of the resolve phase measurement and the distance estimation. For example, the one or more actions can be directed to one or more of the following: object tracking; an Advanced Driver-Assistance System (ADAS); surveillance; and so forth.

FIG. 9 shows an exemplary method 900 for distance estimation between an RFID tag and an RFID reader, in accordance with an embodiment of the present principles.

At block 910, measure, by measurement equipment, a plurality of phase differences at different frequencies between transmitted RF signals from the RFID reader and corresponding received RF signals at the RFID tag.

At block 920, calculate, by the at least one computing device, normalized phases from the plurality of phase differences.

At block 930, calculate, by the at least one computing device, corrected phases by resolving one or more ambiguities from the normalized phases.

At block 940, obtain, by the at least one computing device, a characteristic curve using the corrected phases.

At block 950, provide, by the at least one computing device, an estimate of the distance based on the characteristic curve and the corrected phases.

In an embodiment, block 950 can include block 950A.

At block 950A, display, by a display device, the estimate of the distance.

At block 960, perform one or more actions based on the estimate of the distance. For example, the one or more actions can be directed to one or more of the following: object tracking; an Advanced Driver-Assistance System (ADAS); surveillance; and so forth.

A description will now be given regarding various actions that can be performed, in accordance with various embodiments of the present invention. The actions relate to steps 650, 750, 850, and 960 of methods 600, 700, 800, and 900, respectively, as described with respect to FIGS. 6, 7, 8, and 9, respectively.

Regarding object tracking, the one or more actions can include, but are not limited to, one or more of the following: generate an image showing the objects; provide a user-perceptible object tracking result (e.g., a distance estimate) to a user; perform one or more actions relating to the distance estimate. In an embodiment, the user-perceptible object tracking result can be in the form of a list of tracked objects which is displayed on a display device and/or provided through a speaker. The actions that can be performed include, but are not limited to, can relate to any of the following: object (person, pedestrian, animal, weapon, food, etc.) tracking; object tracking with respect to an application and so forth (e.g., retail (tracking customer path in shopping stores, airport or train station shopping malls), smart transportation (tracking and regulating passenger or vehicle flow in airports, bus and train stations), security (monitor inmate separation distances and so forth), safety (maintaining a predetermined distance from a dangerous object or condition)); ADAS (controlling vehicle functions including accelerating, braking, cruise control functions, and so forth); and so forth.

The one or more actions can be initiated by the corresponding at least one computing device or another device, as readily appreciated by one of ordinary skill in the art, given the teachings of the present invention provided herein, while maintaining the spirit of the present invention.

A further description will now be given regarding various aspect of the present invention.

Herein, relative to one or more embodiments of the present invention, techniques are considered that rely on the power and phase of the received signal in order to estimate the distance. Using the phase information allows us to potentially measure time-of-flight that corresponds to the time taken by the transmit wave to travel a distance equivalent to its wavelength. Assuming that the wave travels to and from the object of interest in a given path, and the phase difference between the transmitted and its corresponding signals is measured accurately at the transmission point, the distance traveled by the wave would be some multiples of the wavelength plus the fraction of the wavelength. Therefore, there is an inherent ambiguity associated with the measurement since one cannot determine the exact number of wavelengths travelled by the wave. Moreover, at a given frequency the transmit RF chain (including the antenna) and the receive RF chain (including the antenna) add a fixed, but unknown phase to the measurement. The reflection off of the object also adds a fixed phase (usually corresponding to a half wavelength) to the measurement. Moreover, if the path to and from the object includes some reflectors, there would be potentially another additive phase that has to be accounted for in the measurement.

Under these conditions, it is practically not possible to deduce any distance information based on phase measurement at a single frequency even if the measurement is repeated over time. However, there is an interesting way to find the distance if phase is measured at two different frequencies. Let us assume that there is a single straight path from the Measurement Equipment (ME) to the object of interest (OBJ). The measurement at each frequency can be interpreted as repeatedly using a "ruler" of a size equal to the wavelength of the signal to estimate the distance. However, the measurement does not report how many times the ruler is used but only reports the final fraction of the ruler size. If we use two different rulers (e.g., two different wavelengths corresponding to two frequencies), then the difference between the fractional length at the end can reveal valuable information about the actual distance without even knowing how many times each ruler is used.

In order to account for phase measurement inaccuracy, it is desirable to use multiple measurements at different frequencies. Using multiple frequencies allows for resolving the ambiguities in the phase measurements as well. This ambiguity resolution may include finding the difference between the number of times that the whole ruler is used in the measurement of the distance. In other words, a first ruler may be used $k_1$ number of times with the fraction of the ruler remaining at the end that is equal to $\emptyset_1$ while a second ruler may be used $k_2$ number of times with the remaining fractional size of $\emptyset_2$. In general, we need to assume a relation between $k_1$ and $k_2$, e.g., $k_1=k_2$, in order to estimate the distance based on $\emptyset_1$ and $\emptyset_2$, and it is not possible to resolve this ambiguity if we have only two frequencies. However, if multiple (more than 2) frequencies are used, it would be possible to resolve such ambiguity, e.g., to deduce that $k_2=k_1+1$, in some cases. It will be discussed herein after that there are certain intervals of length where any distance in a given interval can be found uniquely based on the phase information if the phase information is accurate or its error is bounded by a given threshold. This phenomenon is referred to as uncertainty in distance estimation and such intervals are referred to as uncertainty regions. Hence, the accuracy of the distance estimation based on measured phase has three different error types distinguished by ambiguity, uncertainty, and resolution. The resolution depends on the error in the measured phase and usually is modeled by a Gaussian distribution as it is the case with thermal noise.

It is noted that there exists not only an inherent ambiguity in phase estimation due to the fact that any factor of $2\pi$ can be subtracted from or added to a phase without changing it, but also an explicit ambiguity may occur due to the estimation procedure. Most software algorithms and hardware used in phase estimation depend on the arc tangent function which causes a more ambiguous phase measurement with an ambiguity factor that is equal to $\pi$ or equivalently half a wavelength. Herein, an algorithm is provided that does not increase the ambiguity and provide a phase measurement with ambiguity factor of $2\pi$. Moreover, the measured phase is in fact a phase difference between the transmitted and its corresponding received signals. Depending on which signal is considered the base, the sign of the phase difference (or phase shift) is different. Thus, the distance estimation algorithm has to account for the way that the phase difference is computed. In general, unless stated otherwise, we always assume that the transmit signal is considered as a base and the phase difference between the received signal in comparison to the transmit signal is reported. Hence, if a hardware or software algorithm considers the received signal as a base, we account for a negative sign in the phase measurement.

A description will now be given regarding distance estimation using multi-frequency phase measurement, in accordance with an embodiment of the present invention.

The idea of multi-frequency ruler for the purpose of distance estimation is expanded. Without loss of generality let us consider N measurement frequencies $f_1, f_2, f_3, \ldots, f_N$ where $f_i > f_j$ when $i < j$. The associated wavelengths $\lambda_i$, $i=1, \ldots, N$ are given by $$\lambda_i = \frac{c}{f_i},$$

where c is the speed of the light. Hence we have $\lambda_i < \lambda_j$ when $i < j$.

Let us assume that the roundtrip distance between ME and OBJ is denoted by d. We note that in some situations, the distance between the two points might be found by transmission from a point, e.g., ME and reception at another point, e.g., OBJ and hence the distance d represents only the one way path from ME to OBJ. The distance d can be written as $d=k_i \lambda_i + \emptyset_i$ where $\emptyset_i \emptyset[0, \lambda_i)$ and $k_i \in \mathcal{Z}^+ \cup \{0\}$ is a nonnegative integer.

Hereinafter, we show that $\phi_i$ (or its corrected version $\check{\phi}_i$) are an affine function of $\lambda_i$. Let us define a common integer factor as $k = \min_i k_i$ and define the corrected phase $\check{\phi}_i = \phi_i + (k_i - k)\lambda_i$. Please note that with this definition, all $\check{\phi}_i$ are nonnegative. The distance d can be written as $d = k\lambda_i + \check{\phi}_i$, $\forall_i$. Hence, we have the following:

$$k = \frac{\check{\phi}_i - \check{\phi}_j}{\lambda_j - \lambda_i} \quad (1)$$

while we note that since the phase measurements are not usually accurate, the right hand side of Equation 1 has to be approximated with an integer, e.g., using a floor, ceiling, or round function. The difference of $\check{\phi}_i - \check{\phi}_j$ in equation 1 is constant value k times the difference between the corresponding wavelength values $\lambda_j - \lambda_i$. This implies that the relationship between the differential phase and the corresponding differential wavelength is linear. Hence, the following can be written:

$$\check{\phi}_i = \check{\phi}_0 + k(\lambda_i - \lambda_0) = \check{\phi}_0 + k\Delta\lambda = (\check{\phi}_0 - k\lambda_0) + k\lambda_i \quad (2)$$

for some constant values $\check{\phi}_0$ and $\lambda_0$. This establishes the fact that the corrected phase $\check{\phi}$ is an affine function of $\lambda$.

This fact can be used to resolve the ambiguity of the phase estimation by transforming the estimates at different frequencies such that its corresponding normalized phases follow a linear trend versus wavelength. We note that the actual measured phases $\theta$ are given by $$\theta_i = \frac{2\pi \check{\phi}_i}{\lambda_i} + l\pi$$

for some ambiguity factor l. The ambiguity factor at least belongs to the set of even integers since a measured phase has an inherent ambiguity of any multiples of $2\pi$. However, this ambiguity factor could belong to set of all possible integers (odd or even) for most practical phase estimators since the state-of-the-art systems use arc tangent function, which has an ambiguity of any multiples of $\pi$. A phase estimation procedure is proposed that allows for less ambiguity of equal to any multiples of $2\pi$ which is the best that one can hope for.

While we showed that the corrected normalized phases $\check{\phi}_i$ is an affine function of $\lambda_i$, we note that the actual measured phase $\theta_i$ does not follow the same property. In fact, we have the following:

$$\theta_i = \frac{2\pi \check{\phi}_i}{\lambda_i} + l\pi \quad (3)$$

$$= \frac{2\pi \left( (\check{\phi}_0 + k\lambda_0) - k\lambda_i \right)}{\lambda_i} + l\pi \quad (4)$$

$$= \frac{2\pi \left( (\check{\phi}_0 + k\lambda_0) \right)}{\lambda_i} + (l - 2k)\pi \quad (5)$$

This result means that the measured phase versus the wavelength follows a hyperbolic curve. This result enables the resolution of ambiguity for the measured phase. The differential phase that is the difference between two measured phases $\theta_i$ and $\theta_j$ for the wavelength $\lambda_i$ and $\lambda_j$, respectively, can be found as follows:

$$\theta_i - \theta_j = 2\pi \left( (\check{\phi}_0 + k\lambda_0) \right) \left( \frac{1}{\lambda_i} - \frac{1}{\lambda_j} \right) \quad (6)$$

If the wavelengths are equally separated, i.e., $\lambda_i = \lambda_0 + i\delta\lambda$, then we can write the differential of the corrected normalized phases as follows:

$$\check{\phi}_i - \check{\phi}_j = k(j - i)\delta\lambda \quad (7)$$

while for the measured phases $\theta_i$, the differential is given by the following:

$$\theta_i - \theta_j = 2\pi \left( (\check{\phi}_0 + k\lambda_0) \right) \left( \frac{(j-i)\delta\lambda}{\lambda_i \lambda_j} \right) \quad (8)$$

which could be approximated by a linear function if $\delta\lambda \ll \lambda_0$), and we have the following:

$$\theta_i - \theta_j = 2\pi \left( (\check{\phi}_0 + k\lambda_0) \right) \left( \frac{(j-i)\delta\lambda}{\lambda_0^2} \right) \quad (9)$$

The derivation in this section allows us to propose the following solution for the distance estimation based on the phase measurement.

In general, we can maximize the a posteriori probability of the distance d being equal to, e.g., $d_0$. A possible way is to consider GLRT (Generalized Maximum Likelihood Ratio Test). Assuming that the distribution of the measurement is known, one can formulate the problem as follows:

$$\max_{k,d} p(\Theta, k, d) \quad (10)$$

where $p(\Theta, k, d)$ is the probability distribution of the vector of measured phases $\Theta = [\theta_1, \theta_2, \ldots, \theta_N]$, k is the common integer factor, and d is the distance of OBJ from ME. The problem can also be stated in terms of vector of the corrected normalized phases $\check{\Phi} = [\check{\phi}_1, \check{\phi}_2, \ldots, \check{\phi}_n]$ as follows:

$$\max_{k,d} p(\check{\Phi}, k, d) \quad (11)$$

where p ($\check{\Phi}$, k, d) is the joint probability distribution of the vector of corrected normalized phases. For example assuming that this distribution is Gaussian (and independent across frequencies), we have the following:

$$\max_{k,d} p(\check{\Phi}, k, d) = \max_{k,d} \prod_{i=1}^{N} \frac{1}{\sqrt{2\pi\sigma^2}} \exp\left( \frac{-1}{2\sigma^2} (\check{\phi}_i - d - k\lambda_i)^2 \right) \quad (12)$$

This corresponds to the following:

$$\min_{k,d} \sum_{i=1}^{N} (\phi_i - d - k\lambda_i)^2 \quad (13)$$

Taking the derivative with respect to d we have the following:

$$d = \frac{k}{N}\sum_{i=1}^{N} \lambda_i + \frac{1}{N}\sum_{i=1}^{N} \phi_i \quad (14)$$

and taking the derivative with respect to k (treating k as a real number and then digitizing it, e.g., by using a round function), we have the following:

$$k\Sigma_{i=1}^{N}\lambda_i^2 + \Sigma_{i=1}^{N}\lambda_i(\phi_i - d) = 0 \quad (15)$$

Hence, we can approximate k by the following:

$$k = \text{round} \frac{\sum_{i=1}^{N} \lambda_i(\phi_i - d)}{\sum_{i=1}^{N} \lambda_i^2} \quad (16)$$

The last two equations give complete solution for the distance based on the set of the measured phases at different wavelengths.

We note that if the correction of the phases have not happened before, the above formulation and solution cannot work for the corrected normalized phases and the original problem and $$\max_{k,d} p(\Theta, k, d) \quad (17)$$

has to be solved under the constraint that the vector of Θ follow a hyperbolic curve denoted for example by Equation (6) or any simplified version of it such as Equations (8) or (9).

One possible approach is to first resolve the ambiguity and then use the corrected normalized phases to find the distance estimate. Hence, as a first step after gathering the phase information, we need to resolve the ambiguities. The ambiguities for the measured phases could be resolved by considering the fact that all the measured phases lie on a hyperbola. Therefore, the noisy version of the data should follow the best approximation of a hyperbola. In some cases, the hyperbola can be approximated with linear function. Another possibility is to find the uncorrected normalized phase values by multiplying each $\theta_i$ by its wavelength λ (and divide the result by 2π). These uncorrected normalized phases versus wavelength should be lying on a straight line and this property can be used to resolve the ambiguity.

After the step of ambiguity resolution, one can directly use the solution in Equations (14) and (16) to find the distance estimate. The other way is to find the slope of the line for the corrected normalized phases and use the following equation $d = \tilde{\phi}_i + k\lambda_i$. We note that the solution of k in this approach could be a real number in general and it satisfies some optimality constraint. On the other hand one may add a step of digitizing the value of k, e.g., by rounding it to the nearest integer. We also note that if the ambiguity resolution step is performed on the vector of the measured phases directly, then the corrected measured phases have to be modified to get the corrected normalized phases before finding the slope of the line. This step may also be ignored in some cases, depending upon the implementation.

A description will now be given regarding resolving the ambiguity of the measured phases, in accordance with an embodiment of the present invention.

First Observation: Resolving the ambiguity of the measured phases relies on the (first) observation that if the OBJ is not moving and d is constant (or almost constant), the corrected normalized phases follow a particular trend. This means that the corrected normalized phases versus the wavelength is an affine function, hence, it has two unknown parameters, i.e., the value of the function at a given wavelength and the slope of the line. However, in practical cases, the measured phases are noisy, hence, although this linear trend exists, it is approximate. Once the ambiguity is resolved it is easy to use different algorithms to come up with the optimal slope. For example, a least squared algorithm finds a line passing through all points (corrected normalized phases versus wavelength) which has the minimum squared error for all the points. Other algorithms may rely on GLRT, MAP (Maximum a posteriori), or ML (Maximum Likelihood) to find the slope.

Second Observation: The main question is how to generate the corrected normalized phases. A second observation is that the measured phases and/or normalized phases are only meaningful if an ambiguity resolution procedure exists that, for example, takes the measured phases or normalized phases as an input and generates corrected normalized phases or corrected measured phases such that they follow a linear or hyperbolic trend, respectively. Stated otherwise, the noise or the measurement error should be within a reasonable threshold that it does not mask this trend. Therefore, an optimization algorithm to resolve the ambiguity looks for all variations of the normalized phases that can be valid based on the measured phases. To generate all variations, one has to consider adding any integer multiples of lπ (based on the ambiguity factor l) to the measured phases. It also includes adding all possible multiples of 2kπ to normalized measured phases. Among all such variations for all the measured phases, the optimized algorithm should pick the corrected normalized phases as the ones that have the least error in realizing the linear trend for the selected corrected normalized phases. Such algorithm is very exhaustive even if we limit the number of variations by considering a finite multiples of the ambiguity factors.

Hereinafter, a two-step approach is provided for ambiguity resolution as follows: (1) an intra-frequency ambiguity resolution; and (2) an inter-frequency ambiguity resolution. In the first step, we combine all the information gathered for a specific wavelength into a representative group. This algorithm can be viewed as a classification algorithm with a constraint on the representatives of the classes. For example, for each class, consider the mean of all the members of the class and the define the error to be the distance between this mean value and the representative of the class. The constraint may be stated as having the sum of squared error to be less than a threshold. Alternatively, we can define this sum of squared errors as the objective function and minimize this to find the classes. Another example of the error function could be the sum of squared error between each member of the class to the class representative. The sum of all such errors can again be used as an objective function to minimize and find the classes. These classes are then combined into a single group by adding appropriate integer multiples of the ambiguity factor for each class. It is noted that each class should satisfy a figure of merit (FoM), where FoM has to be above a certain (first) threshold for the class to be acceptable. Otherwise, the algorithm can have a decision that below a certain (second) threshold (may be different form the first threshold) for a class, this class is rejected or it is declared that the OBJ is moving or the measurement environment is not stationary.

In the second step of the algorithm, the first observation is used, i.e., the fact that the corrected normalized phases have to follow a trend (up to the measurement error) of an affine function. It is noted that the first step of the algorithm provides a group or measurement set for each wavelength where the intra-frequency ambiguity among the phases have been supposedly resolved. The first step of the algorithm can also provide the assumed representative computed in the first step for this group or a new representative, e.g., the mean or median of the group, may be generated. These representatives can be used to resolve the inter-frequency ambiguity by adding multiples of the ambiguity factor, e.g., π, to the representative of each group such that the new corrected normalized values for the representatives follows a straight line closely. In a more precise statement, this means that the objective value of the lease squared solution for the set of corrected normalized representatives versus wavelength is minimized.

A simple procedure for the second step is as follows. We start from the smallest wavelength and work though each wavelength sequentially to the largest. For each wavelength except the first one, we consider adding a multiple of the ambiguity factor such that the resulting phase is larger than that of the previous wavelength but the difference is less than a threshold. This threshold may depend on the frequency spacing or equivalently wave-length spacing. In particular, if all wavelengths are equally separated, then only one threshold may be used. An example of this threshold is equal to the ambiguity factor. This means that every two consecutive corrected phases are not more than an ambiguity factor apart and the corrected normalized phase versus wavelength is non-decreasing. We note that this procedure is especially more efficient if the wavelengths are equally separated. Since the slope and the y-intercept of the line passing through the corrected normalized phases determines the distance d between OBJ and ME, the threshold on the difference between two corrected normalized phases for two consecutive wavelength $\lambda_i$ and $\lambda_{i+1}$ determines the maximum possible slope that a characteristic curve (the line in this case) can have and it is determined by the ratio of the ambiguity factor to $\delta\lambda$ defined as $\delta\lambda=\lambda_{i+1}-\lambda_i$.

This gives a limit to the maximum distance that multi-frequency distance estimation can uniquely identify. This maximum distance is also referred to as the certainty distance. The uncertainty in the distance estimation states that any distance beyond this distance cannot be uniquely determined based on the measured phases. We note that the certainty distance cannot be made arbitrarily large by reducing the difference between consecutive wavelength $\delta\lambda$, since the principle of ambiguity resolution depends on the first and second observations described earlier, where the variance of the error or noise in phase measurement should not mask the possibility of distinguishing the characteristic curve with a reasonably small error. Therefore, the limiting factor is the error in the phase measurement.

A description will now be given regarding intra-frequency ambiguity resolution, in accordance with an embodiment of the present invention.

Consider a set of measured phases $S_i$ for a given wavelength $\lambda_i$. We would like to find a solution for the following optimization problem:

$$\min_{r(s)R_i} \sum_{s \in S_i} m(s, r(s)) \qquad (18)$$

$$\text{S.t.} \quad \forall r_1, r_2 \in R_i\, r_1 - r_2 = kl\pi, \exists k \in \mathbb{Z} \qquad (19)$$

where m(s,r(s)) denote a distance measure between s and r(s), e.g., $m(s,r(s))=(s-r(s))^2$, and $R_i$ is a set of representative for the wavelength $\lambda_i$, and r(s) is a function that maps every points in the measurement set $S_i$ to one of the points in the representative set $R_i$. This formulation can be interpreted as partitioning the set of measured phases $S_i$ and assigning one representative to each partition and considering an error measure or distance measure that finds the sum of the errors (or distances) between the values in each partition and its representative. The constraint specifies that the representatives have to be separated by integer multiples of the ambiguity factor lπ.

A possible approach to solve this problem is to consider a threshold, e.g., tlπ, for some t∈(0, 1). Going through all the points in set $S_i$, we generate a new partition if the absolute distance between the new point and all previously considered points is more than this threshold, and we put the new point into a previously formed partition if the absolute distance between this point and one of the points (or the representative of the partition) is less than this threshold. For the first point, we just make a new partition with that point. For low to moderate measurement error, this algorithm is always converging to the optimal solution. However, for a large measurement error, solving the above optimization problem directly gives a better answer.

After partitioning the set $S_i$, and finding the representative set $R_i$, one needs to merge these partitions into one group by adding appropriate multiples of the ambiguity factor lπ into each group. The result will be a group of points for which the absolute distance should not exceed the ambiguity factor lπ. If there is no set of integer multiples that can provide such a solution, then the system can declare that the OBJ is moving or the measurement environment is not stationary. Of course, another reason could be that the measurement error itself is too large. We note that by definition this would never happen for the optimal solution since the optimal solution finds the partitions such that their representatives are always integer multiples of the ambiguity factor lπ apart and, hence, it is always possible to subtract the corresponding integer multiple of the ambiguity factor to reach to a group of points that are never more than lπ apart. However, this could happen for the proposed suboptimal solution that performs the partitioning by one pass operation over all the points in the set of measured phases $S_i$.

It is always possible to consider a second threshold $t_2 l\pi$, for some $t_2 \in (0, 1)$ such that if the absolute distance between the data in the final group exceeds this threshold, the system can declare sensing movement or anon-stationary environment. We note that in a practical setting usually $t_2 \geq t$. The larger the value of t, the larger measurement error that can be handled by the proposed solution. However, it is not recommended to use any value greater than one half for t.

The Intra-frequency ambiguity resolution not only is an essential step to generate a meaningful phase reading at each wavelength, but also it provides a means to detect movement of the OBJ or other objects in vicinity of the reader.

A description will now be given regarding inter-frequency ambiguity resolution, in accordance with an embodiment of the present invention.

The output of the previous step, i.e., intra-frequency ambiguity resolution is N groups of measurements for each frequency, e.g., $G_1, G_2, \ldots, G_N$. The optimization problem which to find the distance can be now stated in terms of vector all corrected normalized phases in all groups $g=[g_{11}, g_{12}, \ldots, g_{21}, g_{22}, \ldots]$, where $g_{ij}$ is the $j^{th}$ element of the group i, as follows:

$$\max_{k,d} p(g, k, d) \tag{20}$$

One can potentially finds a representative $r_i$ for each group and form a vector $r=[r_1, r_2, \ldots, r_N]$ and write the optimization problem as follows:

$$\max_{k,d} p(r, k, d) \tag{21}$$

A suboptimal but efficient solution for this problem can be found when the joint probability distribution function is Gaussian. As discussed previously, we note that if the transmit signal is considered as a base for the purpose of differential phase measurement, then the larger the wavelength, the smaller the corrected differential phase. This situation is reversed if the received signal is considered as a base for the purpose of differential phase measurement. In the latter case, the larger the wavelength, the larger the corrected differential phases. In either scenario, a simple yet efficient algorithm may be used for inter-frequency ambiguity resolution such that for each pair of consecutive wavelengths, we resolve the ambiguity by adding appropriate multiples of the ambiguity factor $1\pi$ such that $|r_{i+1}-r_i|<1\pi$. This means that in the former scenario $-1\pi<r_{i+1}-r_i\leq 0$ and in the latter case $0\leq r_{i+1}-r_i<1\pi$. Then, the slope of the resulting curve (or the slope of the least square solution for the corrected normalized phases) is equal to the common integer factor k described earlier. The estimated distance can be then found as $d=k\lambda_i+\check{\phi}_i$ or equivalently $d=k\lambda_i+r_i$.

A description will now be given regarding the received signal at the measurement equipment (ME), in accordance with an embodiment of the present invention.

When a signal is generated by the measurement equipment (ME) and transmitted over the air, there are multiple ways that the return signal from an object of interest (OBJ) could be generated and measured at ME. One possible scenario is the case that the reflection from OBJ is received by ME. This scenario may include a multi-path channel where, for each path, the transmitted signal from ME to OBJ and/or the reflected signal from OBJ to ME might be reflected off of some other objects. The other scenario is the case that OBJ itself receives the transmitted signal from ME (again possibly through multi-path channel) and after processing the signal OBJ, replies back with another signal that is then received by ME (also possibly through multi-path). This latter scenario include the cases that the processing is a simple backscattering modulation of the signal received by OBJ, e.g., in RFID systems.

It should be noted that it is possible to reduce the effect of multi-path and possible reflections off of some object by using polarization. One possible way is to use right handed (RH) circularly polarized (RHCP) transmit waves. In this case, the round-trip path with an odd number of reflections will be received back at ME as inverted polarization, i.e., a left handed (LH) circularly polarized (LHCP) wave, whereas the round-trip path with an even number of reflections will be received with similar polarization as the transmitted signal, i.e., RHCP. Depending on the scenario, one or the other polarization may be ignored. For example, for the systems that rely on the reflection off of OBJ, the inverted polarization will be used and the part of received signal with similar polarization will be ignored. The reason is that the direct path has only one reflection, i.e., an odd reflection and the distance depend on the direct path. In general, the higher the number of reflections, the lower the gain associated with that path. Hence, all the second order paths with only two reflections are ignored and the strongest interference will come from all third order paths with three reflections in their round-trip path, and the third order paths in general have lower average energy than the second order paths.

In the other scenario, where OBJ generates a reply and sends it back, we can only detect signals with even polarization, and ignore the component of the signal with odd polarization. It is to be noted that this depend on the fact that OBJ only uses linear polarization instead of circular polarization for its reply. The fact that odd polarization is ignored relates to the fact that we would like to minimize the contribution of reflections from different objects and possibly including OBJ since the reflections are only interference in this case and the signal to be measured is the reply signal from OBJ. We note that the overall contribution of the odd polarization signal in the received signal at ME is more than the contribution of the even polarized signal due to the aforementioned fact about the reduction of the path gain when the number of the number of reflections in the path increases. However, since the reply from OBJ is linearly polarized, it can be received and detected by the receive RF chain (the circuit and antenna) at ME.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for resolving ambiguity in a phase measurement used in a distance estimation for an object, comprising:
   a transmitter for transmitting RF signals from a location of the object;
   measurement equipment, including a receiver, for receiving the transmitted RF signals as corresponding received RF signals and measuring a plurality of phases at different frequencies between the transmitted RF signals and the corresponding received RF signals;
   a processor configured to
      calculate normalized phases from the plurality of measured phases;
      perform an intra-frequency ambiguity resolution process that resolves an ambiguity for the normalized phases for a single frequency using an ambiguity factor; and
      perform an inter-frequency ambiguity resolution process that resolves an ambiguity for the normalized phases across a plurality of tones using a characteristic curve to provide a resolved phase measurement for the distance estimation for the object.

2. The system of claim 1, wherein the transmitted RF signals are transmitted using a plurality of wavelengths, and wherein the intra-frequency ambiguity resolution process comprises generating a single representative group of corrected phases for a metric selected from the group consisting of a given one of the different frequencies and a given one of the plurality of wavelengths.

3. The system of claim 2, wherein a spread of the single representative group is defined as a maximum difference between group members of the single representative group, and wherein the phase measurement is valid when the spread is less than a threshold.

4. The system of claim 2, wherein a spread of the single representative group is defined as a maximum difference between group members of the single representative group, and wherein the spread is used to determine a non-stationary environment.

5. The system of claim 2, wherein a spread of the single representative group is defined as a maximum difference between group members of the single representative group, and wherein the spread is used to determine a status of the object from among statuses selected from the group consisting of static and moving.

6. The system of claim 1, wherein the transmitted RF signals are transmitted using a plurality of wavelengths, and wherein the intra-frequency ambiguity resolution process comprises partitioning the normalized phases for a metric selected from the group consisting of a given one of the plurality of wavelengths and a given one of the different frequencies into one or more classes such that (a) a representative phase from among the normalized phases is associated with a class and (b) a difference between two representative phases from among the normalized phases is an integer multiple of the ambiguity factor.

7. The system of claim 6, wherein the ambiguity factor is equivalent to a value selected from the group consisting of $2\pi$ and $\pi$.

8. The system of claim 6, wherein a distance measure between the representative phase and members of its class is minimized.

9. The system of claim 6, wherein the one or more classes are generated by adding a normalized phase to a class if a distance of the normalized phase from other members of a same one of the one or more classes is less than a threshold, and wherein a new class is generated when the distance of the normalized phase from members of all of the one or more classes is more than a threshold.

10. The system of claim 9, wherein at least two classes from among the one or more classes and the new class are merged into a single group by adding an integer multiple of the ambiguity factor to at least one member of the at least two classes.

11. The system of claim 1, wherein the inter-frequency ambiguity resolution process is performed by adding a same integer multiple of the ambiguity factor to a member of at least one group to generate a corrected group.

12. The system of claim 11, wherein the adding the same integer multiple of the ambiguity factor to a member of at least one group is performed such that resulting group members follow a characteristic curve.

13. The system of claim 11, wherein the transmitted RF signals are transmitted using a plurality of wavelengths, and wherein a maximum distance between the normalized phases of members of the corrected group for two consecutive ones of the plurality of wavelengths is less than the ambiguity factor.

14. The system of claim 11, wherein a characteristic error that is a sum of mean squared difference between the members of corrected group and the characteristic curve is minimized.

15. The system of claim 14, wherein the characteristic error is used to determine a nonstationary environment.

16. The system of claim 14, wherein the characteristic error is used to determine a status of the object from among statuses selected from the group consisting of static and moving.

17. The system of claim 1, wherein the transmitted RF signals are transmitted using a plurality of wavelengths, and wherein the characteristic curve, relating to the normalized phases versus the plurality of wavelengths, is a function selected from a group of functions consisting of an affine function and a hyperbolic function.

18. The system of claim 1, wherein the plurality of frequencies are Orthogonal Frequency Division Multiplexing (OFDM) tones in an OFDM system.

19. A computer-implemented method for resolving ambiguity in a phase measurement used in a distance estimation for an object, comprising:
   measuring, by measurement equipment, a plurality of phases at different frequencies between transmitted Radio Frequency (RF) signals from a location of the object and corresponding received RF signals at the measurement equipment;

calculating, by a processor, normalized phases from the plurality of measured phases;

performing, by the processor, an intra-frequency ambiguity resolution process that resolves an ambiguity for the normalized phases for a single frequency using an ambiguity factor; and performing, by the processor, an inter-frequency ambiguity resolution process that resolves an ambiguity for the normalized phases across a plurality of tones using a characteristic curve to provide a resolved phase measurement for the distance estimation for the object.

20. A computer program product for resolving ambiguity in a phase measurement used in a distance estimation for an object, the computer program product comprising a non-transitory computer readable storage medium having program instructions embodied therewith, the program instructions executable by a computer to cause the computer to perform a method comprising:

measuring, by measurement equipment, a plurality of phase differences at different frequencies between transmitted Radio Frequency (RF) signals from a location of the object and corresponding received RF signals at the measurement equipment;

calculating, by a processor, normalized phases from the measured phases;

performing, by the processor, an intra-frequency ambiguity resolution process that resolves an ambiguity for the normalized phases for a single frequency using an ambiguity factor; and performing, by the processor, an inter-frequency ambiguity resolution process that resolves an ambiguity for the normalized phases across a plurality of tones using a characteristic curve to provide a resolved phase measurement for the distance estimation for the object.

* * * * *